United States Patent [19]
Yoshida

[11] Patent Number: 5,499,332
[45] Date of Patent: Mar. 12, 1996

[54] CHARACTER PROCESSING METHOD AND APPARATUS

[75] Inventor: Masayuki Yoshida, Yokohama, Japan

[73] Assignee: Canon Kabushiki Kaisha, Tokyo, Japan

[21] Appl. No.: 312,934

[22] Filed: Sep. 30, 1994

Related U.S. Application Data

[63] Continuation of Ser. No. 679,093, Apr. 2, 1991, abandoned.

[30] Foreign Application Priority Data

Apr. 4, 1990 [JP] Japan ................................. 2-89606

[51] Int. Cl.$^6$ .................................................. G09G 5/24
[52] U.S. Cl. .................................................. 395/150
[58] Field of Search .................................. 395/150, 151, 395/110; 345/127–131, 144, 192–195

[56] References Cited

U.S. PATENT DOCUMENTS

| | | | |
|---|---|---|---|
| 4,331,955 | 5/1982 | Hansen | 340/728 |
| 4,757,551 | 7/1988 | Kobayashi et al. | 382/18 |
| 4,827,358 | 5/1989 | Matsumoto | 358/296 |
| 4,843,593 | 6/1989 | Yanaru et al. | 364/900 |
| 4,860,119 | 8/1989 | Maniwa et al. | 358/296 |
| 5,018,217 | 5/1991 | Yoshida et al. | 382/22 |
| 5,029,109 | 7/1991 | Ikenoue et al. | 364/519 |
| 5,099,435 | 3/1992 | Collins et al. | 395/150 |

FOREIGN PATENT DOCUMENTS

| | | |
|---|---|---|
| 356262 | 2/1980 | European Pat. Off. . |
| 16651 | 10/1980 | European Pat. Off. . |
| 114253 | 8/1984 | European Pat. Off. . |

OTHER PUBLICATIONS

Patent Abstracts of Japan, vol. 6159 (kokai 57–076675) (May 1982).
Patent Abstracts of Japan, vol. 14237 (kokai 2–63762) (May 1990).

*Primary Examiner*—Mark K. Zimmerman
*Assistant Examiner*—Joseph H. Feild
*Attorney, Agent, or Firm*—Fitzpatrick, Cella, Harper & Scinto

[57] ABSTRACT

There are provided a character processing method and apparatus having a function to convert data such as a character or the like which has been encoded by a vector form, into data of a dot form. The apparatus has a converter to convert data of a vector form into data of a dot form, and a discriminating circuit to discriminate whether painting of an outline is omitted or not, on the basis of the size of output data after conversion into dot-form data. As the result of the discrimination, if the painting process should not be omitted, the painting process is executed. If the painting process can be omitted, the painting process is omitted. Even a large character can be processed at a high speed without deterioration in the quality, and a small character can be processed at a high speed at a high quality.

24 Claims, 7 Drawing Sheets

FIG. 5A
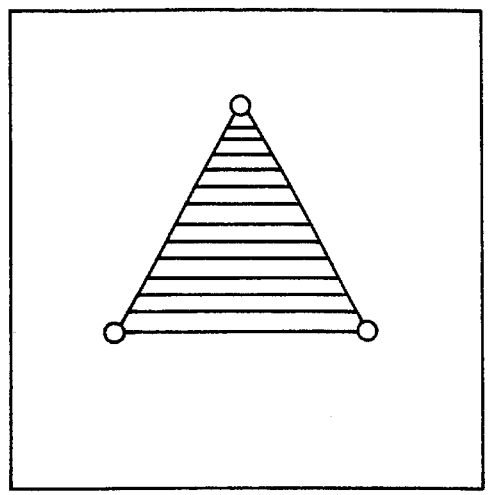
FIG. 5B
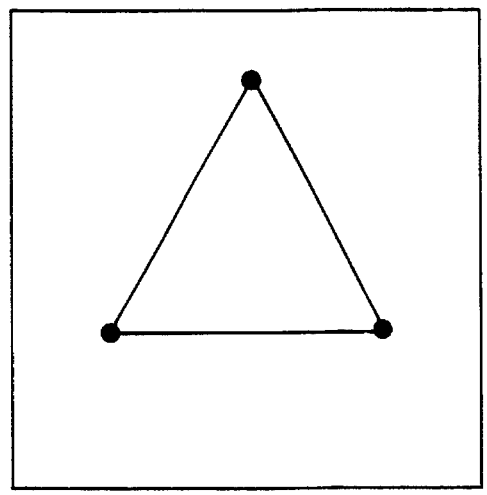
OR
FIG. 5C
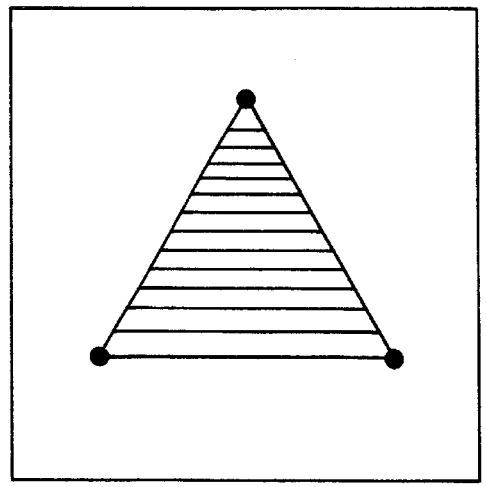

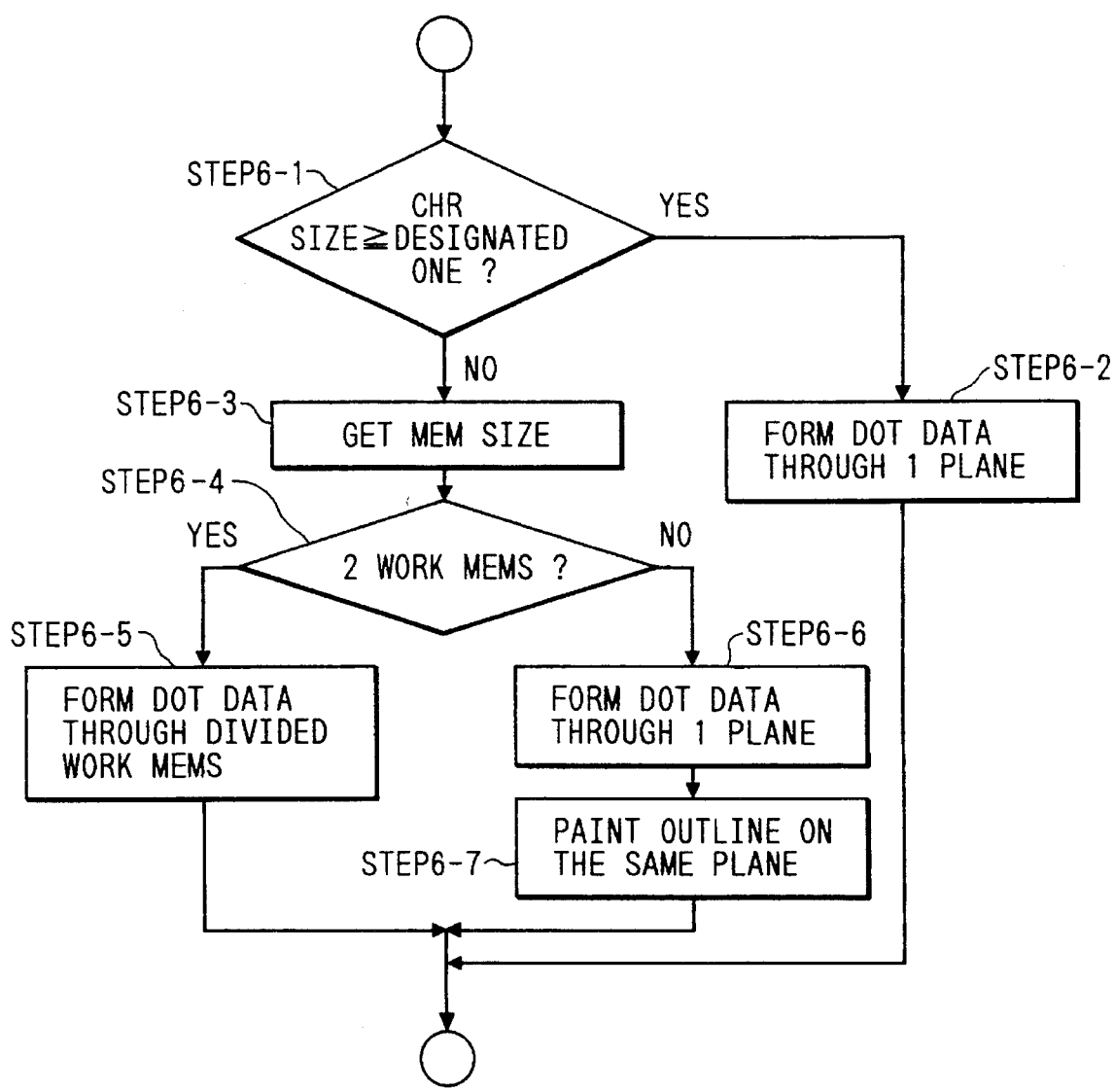

FIG. 7A
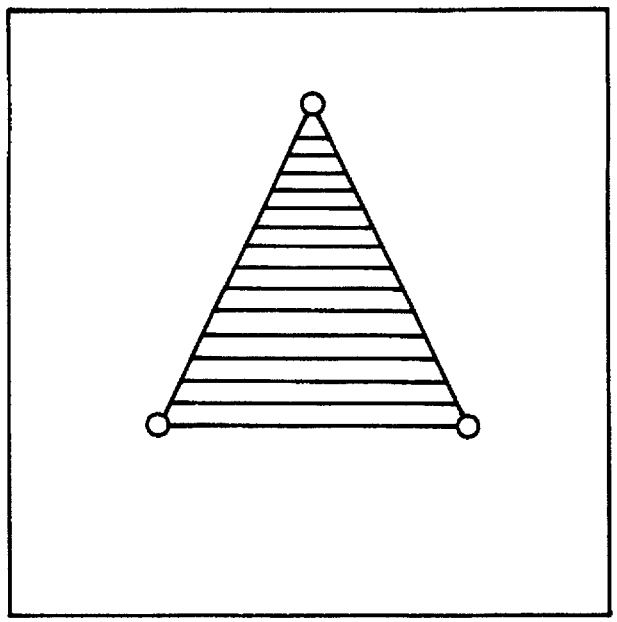
FIG. 7B
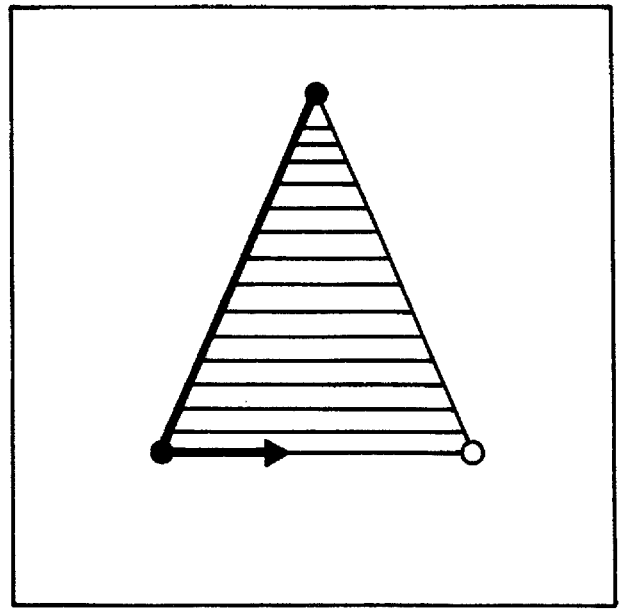

CHARACTER PROCESSING METHOD AND APPARATUS

This application is a continuation of application Ser. No. 07/679,093, filed Apr. 2, 1991, now abandoned.

BACKGROUND OF THE INVENTION

1. Field of the Invention

The present invention relates to character processing method and apparatus having a function to convert a character which has been encoded by a vector form or the like into a character of a dot form.

2. Related Background Art

Hitherto, when data in vector form is converted into data of a dot form, there is case where after the data of the vector form is converted into the data of the dot form, a process to again paint only the outline is executed.

However, although the above process is effective for a small character, there is a problem that if the process to again paint the outline is executed on a large character, the quality itself doesn't change greatly, and an additional time for such process is required.

SUMMARY OF THE INVENTION

To solve the above problem, it is an object of the invention to provide a character processing method and apparatus in which, for a large character, after data of vector form is converted into data of dot form, the data is generated without performing a process to again paint the outline, so that the data can be generated at a high speed without deterioration in a character quality.

BRIEF DESCRIPTION OF THE DRAWINGS

FIGS. 5A, 5B and 5C are diagrams showing an example in which data of dot form is formed according to the invention;

FIG. 6 is a flowchart showing the details of another embodiment of the invention;

FIGS. 7A and 7B are diagrams showing an example in which data is formed according to another embodiment of the invention.

DETAILED DESCRIPTION OF THE PREFERRED EMBODIMENTS

The preferred embodiment of the invention will be described hereinbelow.

The invention can be applied to a system which is constructed by a plurality of apparatuses or a system comprising one apparatus. The invention can be also obviously applied to the case where it is accomplished by supplying a program to a system or an apparatus (i.e., implemented by software rather than by hardware alone).

Figure 1:
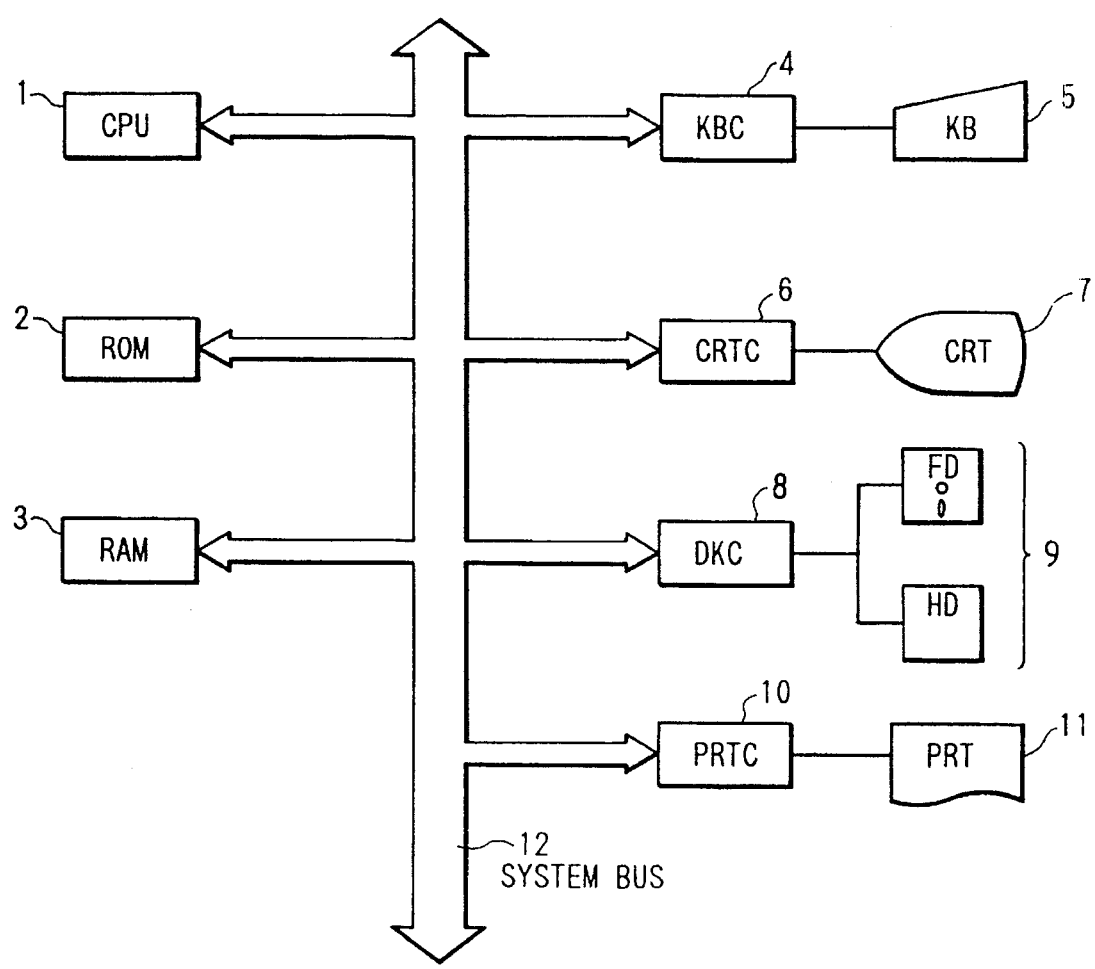
FIG. 1 is a block diagram showing an internal construction of the invention.

FIG. 1 is a block diagram showing a fundamental construction of a Japanese word processor according to the invention. In FIG. 1, reference numeral 1 denotes a CPU (Central Processing Unit) to execute control of the entire apparatus, arithmetic operating processes, and the like. Reference numeral 2 denotes a ROM (Read Only Memory) serving as memory areas to store programs shown in flowcharts, which will be explained hereinafter, a system actuating program, character pattern, data, and the like. Reference numeral 3 denotes a RAM (Random Access Memory) serving as data memory areas having no use limit. Programs and data for various processes are stored in the RAM 3 and are executed. Reference numeral 4 denotes a KBC (Keyboard Control Section) for receiving key input data from a KB (Keyboard) 5 and transmitting to the CPU 1. Reference numeral 6 indicates a CRTC (Display Control Section); 7 a CRT (Display Device) for receiving 1 data from the CRTC 6 and displaying; and 9 an external memory device such as FD (Floppy Disk Device), HD (Hard Disk Device), or the like. The programs and data are stored into the external memory device 9 and are referred or loaded into the RAM 3 as necessary upon execution. Reference numeral 8 indicates a DKC (Disk Control Section) to control a data transmission and the like; 10 a PRTC (Printer Control Section); 11 a PRT (Printer) as a dot printer such as laser beam printer, ink jet printer, or the like; and 12 a system bus serving as a path of the data among the above component elements.

The invention can be realized in a system comprising a plurality of apparatuses or a single system comprising one apparatus. Further, the invention can be also realized by supplying a program to a work station or the like.

The operation of the embodiment with the above construction will now be described with reference to the flowchart of FIG. 2 and FIG. 3 as an example.

Figure 2:
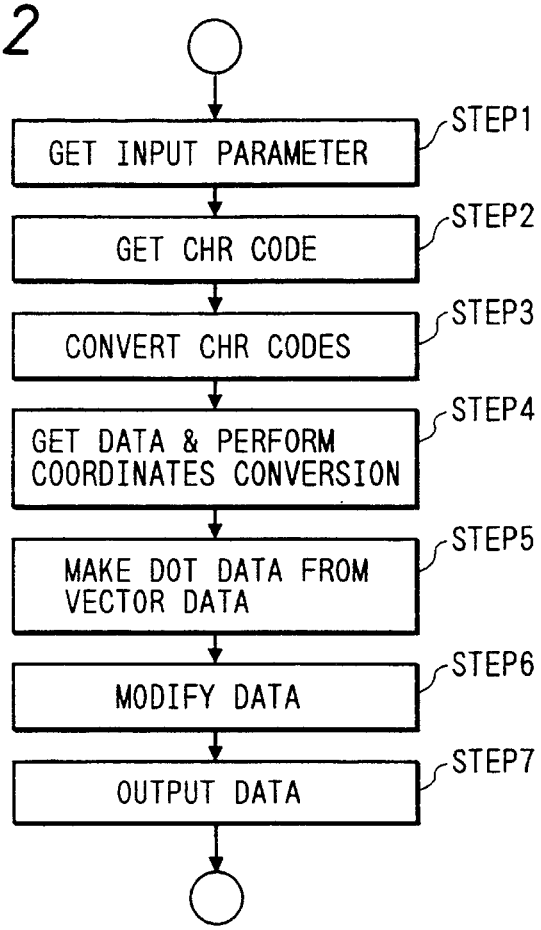
FIG. 2 is a flowchart showing the operation of the apparatus of the invention.

In step 1 in FIG. 2, information which is transferred from the output device side is fetched as input parameters.

The parameters which are transferred from the output device side include: the size of the whole output area; information on the actual output area; and the like.

Figure 3:
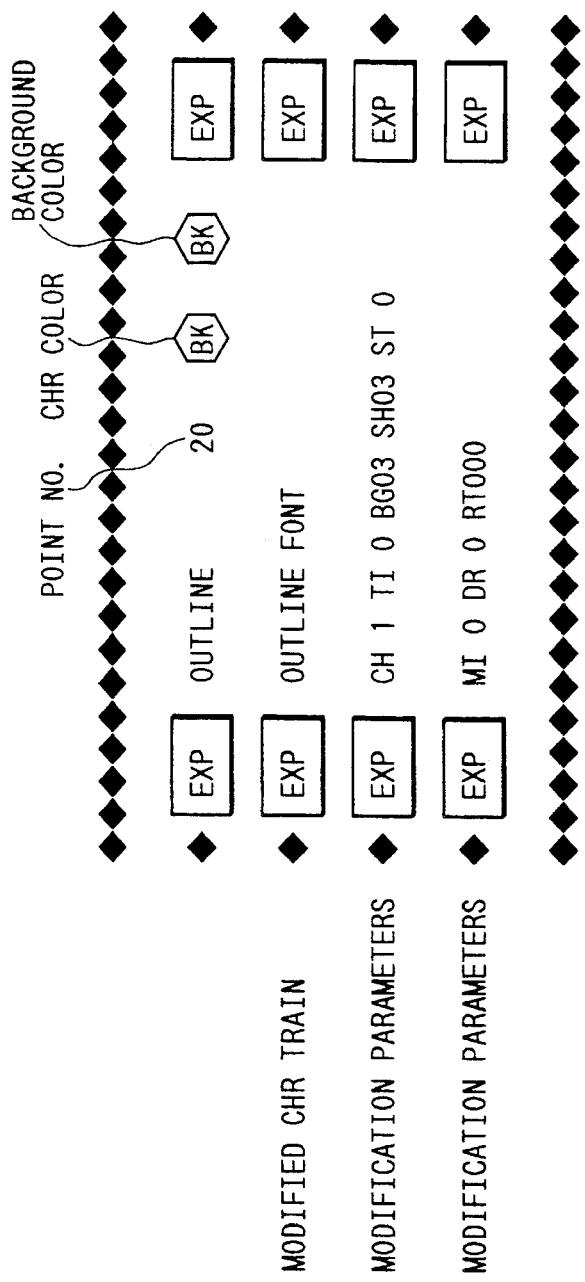
FIG. 3 shows an area assembled on a document screen.

In step 2, there is executed a process to read information such as point number, character train, modification type, and the like which have been written in an area which is assembled in a document screen as shown in FIG. 3 and is used to convert data of a vector form into data of a dot form. The area which is used in the specification may be set to any one of ruled lines, a table, a box, and the like. The document screen shown in FIG. 3 is obtained by setting a command or the like by key input data from the keyboard in the case of, for example, a word processor.

In step 3, only the necessary data in a character train to be developed is not changed but the data which is unnecessary at that time is replaced to space codes.

In step 4, the character code train after completion of the conversion of step 3 is checked and if the character codes are the codes other than the space codes, the data of the vector form corresponding to the character codes and the dot attributes of a straight line/a curved line are read and stored into the memory device and the conversion of x and y coordinate values as data of the vector form is executed in accordance with the character size and the modification type which have been read in step 2. On the other hand, if the character codes are the space codes, the information having no data which has been read is stored into the memory device.

In step 5, data of the dot form is formed on the basis of the x/y coordinate data which has been stored in the memory device in step 4. At this time, when the data of the dot form is formed from the data of the vector form on the basis of the size of memory which can be developed and the size of character to be generated, the data of the vector form is once converted into the data of the dot form and, thereafter, a determination is made to see if a process to paint the outline is executed or not. Then, the process is performed. The details will be explained hereinbelow.

In step 6, the data which has been converted into the data of the dot form is subjected to a modification such as to add a mesh or background pattern to the data on the basis of the modification information read in step 2.

In step 7, the necessary portion in the data of the dot form formed in step 6 is transferred to the memory device on the output side.

Figure 4:
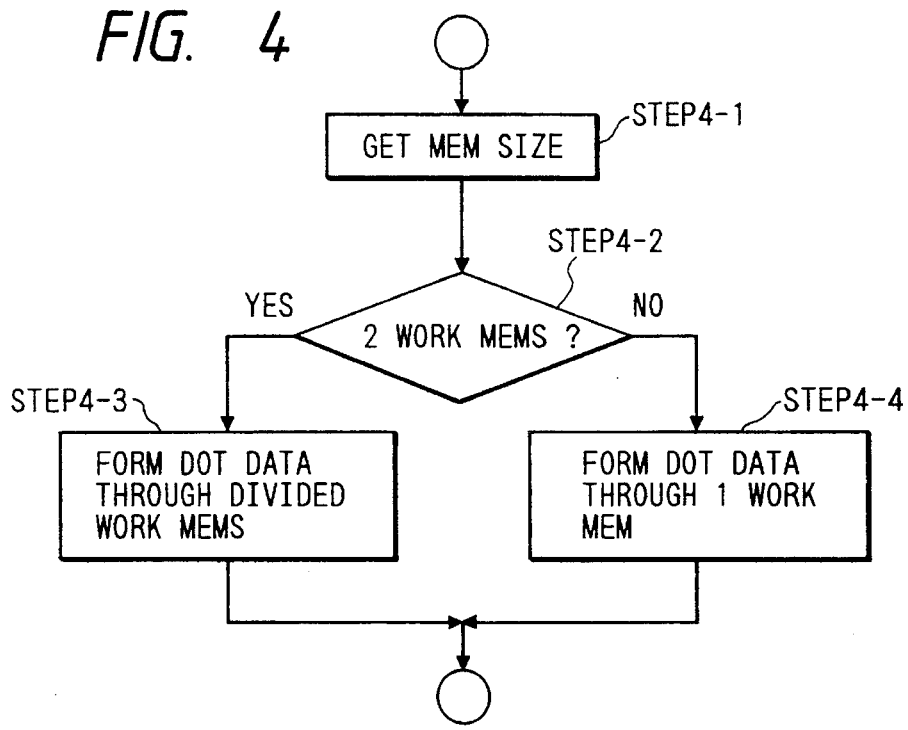
FIG. 4 is a flowchart showing the details of the invention.

FIG. 4 is a flowchart for explaining the process of step 5 in FIG. 2 in detail.

Figure 8A:
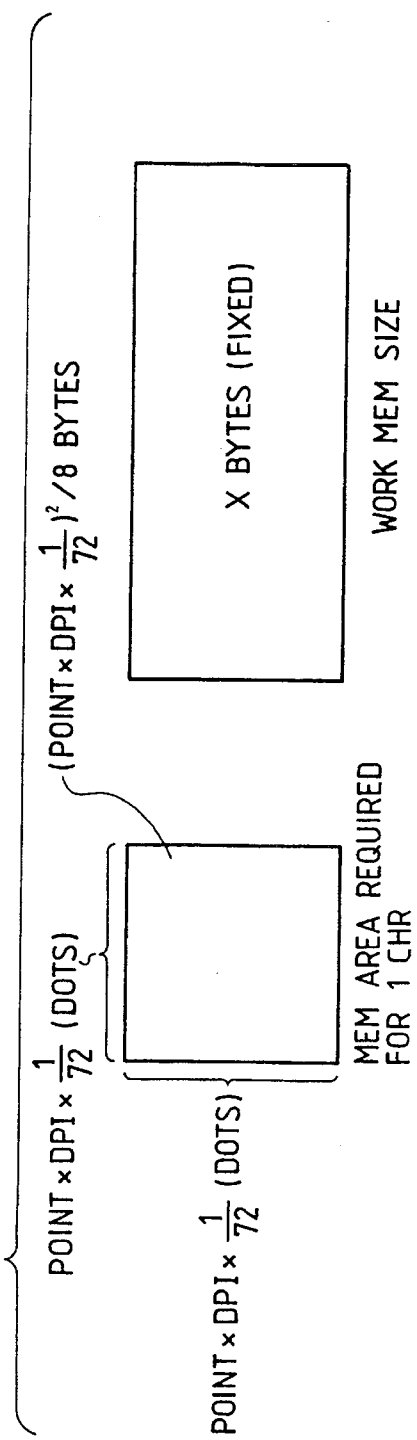
FIGS. 8A and 8B are diagrams showing the details of discriminating processes in an embodiment of the invention.
Figure 8B:
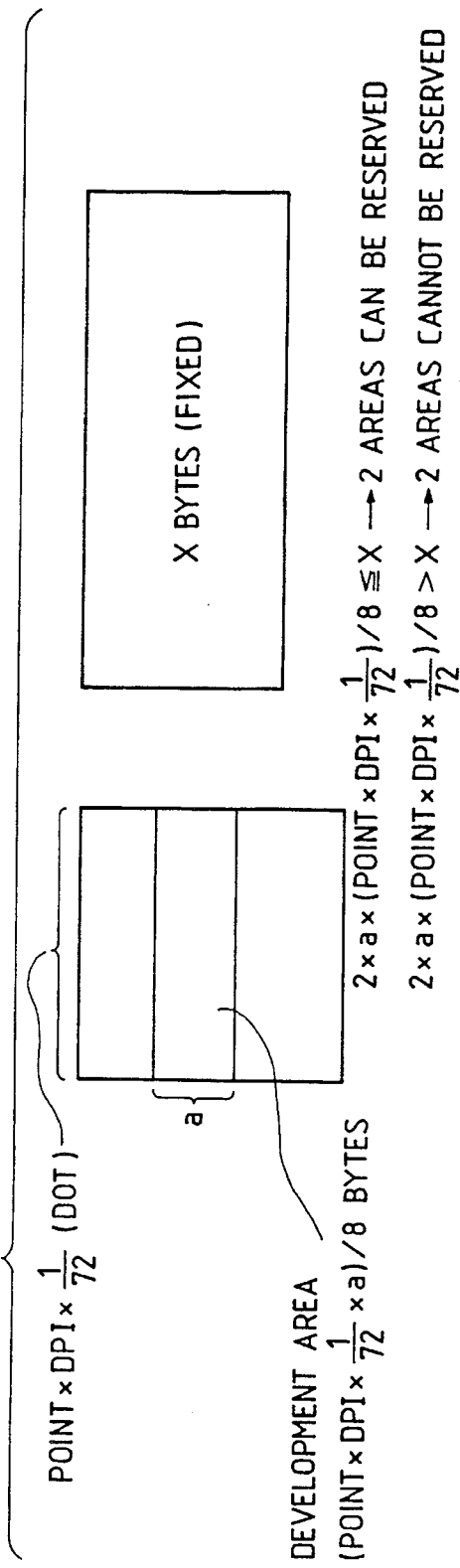

In step 4-1 in FIG. 4, a size of work memory which can be used by the program is got. In step 4-2, a check is made to see if a memory area corresponding to two characters of the size designated in the work memory to which the size of character fetched in step 2 in FIG. 2 had been given can be reserved or not. As a discriminating method in step 4-2, as shown in FIG. 8A, the memory area to be needed is calculated on the basis of the size (point number) of the character designated and the output density (DPI: dots per inch) of the output device. If the size of area which is twice as large as such a memory area is smaller than the size of work memory, it is decided that the area can be reserved. If it is equal to or larger than the work memory size, it is decided that the area cannot be reserved. At this time, if a partial area has been set as a work memory area as shown in FIG. 8B, a check is made to see if the area which is twice as large as the size of work memory can be reserved or not on the basis of a vertical width of partial area and the designated character size (lateral width).

If the area of two characters of the designated size can be reserved, the processing routine advances to step 4-3. If such an area cannot be reserved, step 4-4 follows. In step 4-3, the work memory which can be used is divided into two memories as shown in FIGS. 5A and 5B. In one of the work memories, as shown in FIG. 5A, the data of the vector form is converted into the data of the dot form while painting. In another work memory, as shown in FIG. 5B, the data of the dot form comprising only an outline is formed from the data of the vector form without executing the painting process. As shown in FIG. 5C, the OR of both of the above data which have been divided into two data and converted into the data of the dot form, respectively, is calculated, thereby forming the data of the dot form.

In step 4-4, the work memory which can be used is not divided into two work memories but the data of the vector form is converted into the data of the dot form while painting as shown in FIG. 5A as one work memory. After completion of the process of step 4-3 or 4-4, the processing routine advances to step 6 in FIG. 2 and the data is modified.

As mentioned above, according to this embodiment, the quality is improved for a small character, and a large character can be processed at a high speed without deterioration in the quality.

ANOTHER EMBODIMENT

The above embodiment has been described with respect to an example in which the work memory is divided into two memories, a check is made to see if a character of the designated size can be stored in the divided memory or not, and a decision is made to see if the process to convert the data into the data of the dot form comprising only the outline is executed or not. Another embodiment in the case of previously designating the size of character when converting only the outline into the data of the dot form will now be described with reference to the flowchart of FIG. 6 and FIG. 7 as an example.

The flowchart of FIG. 6 corresponds to the flowchart of FIG. 4. In step 6-1, if the size of character obtained in step 2 in FIG. 2 is equal to or larger than the size of character which has previously been designated, step 6-2 follows. If it is smaller than the designated size, step 6-3 follows. In step 6-2, in a manner similar to the case shown in step 4-4 in FIG. 4, one work memory is not divided into two memories but is used as a single work area and the data of the vector form as shown in FIG. 5A is converted into the data of the dot form while painting. Steps 6-3 to 6-5 correspond to steps 4-1 to 4-3 in FIG. 4, respectively. In the case where the work memory has been divided into two memories, a check is made to see if the data of the character of the size to be generated which has been obtained in step 2 in FIG. 2 can be stored into the divided work memory or not. If YES, the data of the dot form obtained by converting the data of the vector form while painting is stored into one of the work memories shown in FIGS. 5A and 5B. On the other hand, the data of the dot form obtained by converting only the outline is stored into another work memory. The OR of the data in the two work memories is got and the processing routine is finished.

In step 6-6, when the data of the vector form is converted into the data of the dot form, the data of the vector form is once converted into the data of the dot form and, further, only the outline is converted into the data of the dot form and such a process is executed in the case where when the work memory has been divided into two memories, the data of the character of the size to be generated cannot be stored into one of the work memories. As shown in FIGS. 7A and 7B, the work memory is not divided into two memories but a process is executed as a single work memory. First, as shown in FIG. 7A, the data of the vector form is converted into the data of the dot form. As shown in FIG. 7B, the process corresponding to FIG. 5B is executed in the same work memory. That is, a process to paint the outline is performed on the same memory as the work memory in which the data of the dot form obtained by converting the data of the vector form while executing the painting process has been stored. As compared with the processes in FIGS. 5A and 5B, since the process must be executed twice to calculate the coordinate system of the bit map from the vector data, it takes a slightly long processing time. However, such a process is necessary to maintain the quality in the case where the size of character to be generated is smaller than a predetermined point number.

As mentioned above, a decision is made to see if the outline is painted or not after the data of the vector form has once been converted into the data of the dot form in dependence on whether the character size is larger or smaller than the designated size by preliminarily considering the quality. Thus, the process can be executed at a high speed without deterioration in the quality.

As described in detail above, the size of character which has previously been designated in consideration of the size of prepared work memory and the size of character to be generated or the quality is compared with the size of character to be generated. After the data of the vector form is once converted into the data of the dot form while painting, a determination is made to see if the process to again paint the outline is executed or not on the basis of the result of the size discrimination. Thus, a large character can be processed at a high speed without deterioration in the quality.

I claim:

1. A character processing apparatus comprising:

converting means for converting vector data into dot data, said converting means having a first painting process of painting an outline of a character based on the vector data and a second painting process of painting an area specified by the outline of the character based on the vector data;

recognizing means for recognizing a size of a character to be output; and selection means for selecting a first mode in response to a recognition by said recognizing means that the recognized size is larger than a predetermined size and for selecting a second mode in response to a recognition by said recognizing means that the recognized size is smaller than the predetermined size, wherein, in the first mode, the first painting process is omitted and the second painting process is executed, and, in the second mode, both the first and second painting processes are executed.

2. An apparatus according to claim 1, further comprising means for storing the dot data and means for outputting the dot data stored in said storage means.

3. An apparatus according to claim 2, wherein said output means comprises a CRT device.

4. An apparatus according to claim 2, wherein said output means comprises a laser beam printer.

5. An apparatus according to claim 2, wherein said output means comprises an ink jet printer.

6. An apparatus according to claim 1, wherein, in the second mode, if two work memories can be reserved, the first and second painting processes are executed using respective different work memories, and if two work memories cannot be reserved, the second painting process is executed and thereafter the first painting process is executed, using one reserved work memory.

7. A character processing method comprising the steps of:

converting vector data into dot data, said converting step being performed using at least one of a first painting process of painting an outline of a character based on the vector data and a second painting process of painting an area specified by the outline of the character based on the vector data;

recognizing a size of a character to be output; and selecting a first mode in response to a recognition in said recognizing step that the recognized size is larger than a predetermined size and for selecting a second mode in response to a recognition in said recognizing step that the recognized size is smaller than the predetermined size, wherein, in the first mode, the first painting process is omitted and the second painting process is executed, and, in the second mode, both the first and second painting processes are executed.

8. A method according to claim 7, further comprising the steps of storing the dot data and of outputting the dot data stored in said storing step.

9. A method according to claim 8, wherein said outputting step is performed using a CRT device.

10. A method according to claim 8, wherein said outputting step is performed using a laser beam printer.

11. A method according to claim 8, wherein said outputting step is performed using an ink jet printer.

12. A method according to claim 7, wherein, in the second mode, if two work memories can be reserved, the first and second painting processes are executed using respective different work memories, and if two work memories cannot be reserved, the second painting process is executed and thereafter the first painting process is executed, using one reserved memory area.

13. A character processing apparatus comprising:

converting means for converting vector data into dot data, said converting means having a first painting process of painting an outline of a character based on the vector data and a second painting process of painting an area specified by the outline of the character based on the vector data;

recognizing means for recognizing a size of a character to be output; and selection means for selecting a first mode in response to a recognition by said recognizing means that the recognized size is larger than a predetermined size and for selecting a second mode in response to a recognition by said recognizing means that the recognized size is smaller than the predetermined size, wherein, in the first mode, either (1) the first painting process is omitted and the second painting process is executed using one memory area or (2) the second painting process is executed and thereafter the first painting process is executed using one memory area, and in the second mode, both the first and second painting processes are executed using two memory areas.

14. An apparatus according to claim 13, further comprising means for storing the dot data and means for outputting the dot data stored in said storage means.

15. An apparatus according to claim 14, wherein said output means comprises a CRT device.

16. An apparatus according to claim 14, wherein said output means comprises a laser beam printer.

17. An apparatus according to claim 14, wherein said output means comprises an ink jet printer.

18. An apparatus according to claim 13, wherein, in the first mode, if two memory areas cannot be reserved, the second painting process is executed and thereafter the first painting process is executed using one reserved memory area.

19. A character processing method comprising the steps of:

converting vector data into dot data, said converting step being performed using at least one of a first painting process of painting an outline of a character based on the vector data and a second painting process of painting an area specified by the outline of the character based on the vector data;

recognizing a size of a character to be output; and selecting a first mode in response to a recognition in said recognizing step that the recognized size is larger than a predetermined size and for selecting a second mode in response to a recognition in said recognizing step that the recognized size is smaller than the predetermined size, wherein, in the first mode, either (1) the first painting process is omitted and the second painting process is executed using one memory area or (2) the second painting process is executed and thereafter the first painting process is executed using one memory area, and in the second mode, both the first and second painting processes are executed using two memory areas.

20. A method according to claim 19, further comprising the steps of storing the dot and of outputting the dot data stored in said storing step.

21. A method according to claim 20, wherein said outputting step is performed using a CRT device.

22. A method according to claim 20, wherein said outputting step is performed using a laser beam printer.

23. A method according to claim 20, wherein said outputting step is performed using an ink jet printer.

24. A method according to claim 19, wherein, in the first mode, if two memory areas cannot be reserved, the second painting process is executed and thereafter the first painting process is executed using one reserved memory area.

* * * * *

UNITED STATES PATENT AND TRADEMARK OFFICE
CERTIFICATE OF CORRECTION

PATENT NO. : 5,499,332
DATED : March 12, 1996
INVENTOR(S) : MASAYUKI YOSHIDA                   Page 1 of 2

It is certified that error appears in the above-identified patent and that said Letters Patent is hereby corrected as shown below:

On the title page,

AT [56] REFERENCES CITED

Foreign Patent Documents,
"356262  2/1980 European Pat. Off." should read
--356262  2/1990 European Pat. Off.--.

AT [57] ABSTRACT

Line 14, "at a" (second occurrence) should read --with--.

COLUMN 1

Line 17, "a" should be deleted and
"case" should read --a case--.
Line 23, "an" should be deleted.
Line 34, "a" should be deleted.

COLUMN 2

Line 7, "hereinafter," should read --hereinbelow,--.
Line 16, "1" should be deleted.

COLUMN 4

Line 50, "long" should read --longer--.

UNITED STATES PATENT AND TRADEMARK OFFICE
CERTIFICATE OF CORRECTION

PATENT NO. : 5,499,332
DATED : March 12, 1996
INVENTOR(S) : MASAYUKI YOSHIDA

It is certified that error appears in the above-identified patent and that said Letters Patent is hereby corrected as shown below:

COLUMN 7

Line 7, "dot and" should read --dot data and--.

Signed and Sealed this

Sixth Day of August, 1996

Attest:

BRUCE LEHMAN

Attesting Officer

Commissioner of Patents and Trademarks